US012413619B2

(12) United States Patent
Hudson

(10) Patent No.: US 12,413,619 B2
(45) Date of Patent: Sep. 9, 2025

(54) ENTERPRISE PROTECTION VIA IDENTIFICATION AND MITIGATION OF BAD ACTORS AT THE EDGE

(71) Applicant: PARRY LABS LLC, Alexandria, VA (US)

(72) Inventor: Justin Nathaniel Hudson, Alexandria, VA (US)

(73) Assignee: PARRY LABS LLC, Alexandria, VA (US)

( * ) Notice: Subject to any disclaimer, the term of this patent is extended or adjusted under 35 U.S.C. 154(b) by 226 days.

(21) Appl. No.: 18/208,281

(22) Filed: Jun. 11, 2023

(65) Prior Publication Data

US 2024/0422138 A1    Dec. 19, 2024

(51) Int. Cl.
*H04L 9/40* (2022.01)
*H04L 9/00* (2022.01)
*H04W 12/122* (2021.01)

(52) U.S. Cl.
CPC .......... *H04L 63/1483* (2013.01); *H04L 9/008* (2013.01); *H04L 63/1425* (2013.01); *H04W 12/122* (2021.01); *H04L 63/0435* (2013.01); *H04L 63/108* (2013.01); *H04L 63/1416* (2013.01)

(58) Field of Classification Search
CPC . H04L 63/1483; H04L 9/008; H04L 63/1425; H04L 63/0435; H04L 63/108; H04L 63/1416; H04W 12/122
See application file for complete search history.

(56) References Cited

U.S. PATENT DOCUMENTS

| | | | |
|---|---|---|---|
| 2011/0222421 A1* | 9/2011 | Jana | H04L 63/1441 370/252 |
| 2018/0302373 A1* | 10/2018 | Ezell | H04L 67/1036 |
| 2019/0141056 A1* | 5/2019 | Estabrooks | H04L 63/20 |
| 2020/0127861 A1* | 4/2020 | Doshi | H04L 41/142 |
| 2020/0304294 A1* | 9/2020 | Li | H04L 9/0637 |
| 2021/0099308 A1* | 4/2021 | Abbas | H04L 9/3242 |
| 2022/0386126 A1* | 12/2022 | O'Connor | H04W 12/122 |
| 2023/0315438 A1* | 10/2023 | Suto | G06F 8/71 717/168 |
| 2024/0129321 A1* | 4/2024 | Howe | H04L 63/20 |
| 2024/0185191 A1* | 6/2024 | Bernardi | H04L 9/50 |
| 2024/0195618 A1* | 6/2024 | Paul | H04L 9/14 |

OTHER PUBLICATIONS

Flauzac, Olivier; Nolot, Florent; Rabat, Cyril; Steffenel, Luiz-Angelo; "Grid of Security: A New Approach of the Network," Third International Conference on Network and System Security, IEEE, Gold Coast, QLD, Australia, Oct. 19-21, 2009, pp. 67-72.*

(Continued)

*Primary Examiner* — Victor Lesniewski
(74) *Attorney, Agent, or Firm* — Von Rohrscheidt Patents

(57) ABSTRACT

A smart communication system that provides enterprise protection via identification and mitigation of bad actors at the edge by employing homomorphic encryption in conjunction with monitoring the time stamps of edge devices, making sure those edge devices are geographically located where they are supposed to be, and making sure those edge devices are operating consistent the hardware they are known to be.

19 Claims, 1 Drawing Sheet

(56) References Cited

OTHER PUBLICATIONS

Shetty, Sachin; Song, Min; Ma, Liran; "Rogue Access Point Detection by Analyzing Network Traffic Characteristics," Military Communication, IEEE, Orlando, FL, USA, Oct. 29-31, 2007, pp. 1-7.*
Patel, Kashyap C.; Patel, Ajaykumar; "Rogue Access Point: The WLAN Threat," International Conference on Computing, Communication, and Intelligent Systems (ICCCIS), IEEE, Greater Noida, India, Nov. 4-5, 2022, pp. 943-950.*
Jung, Boo Geum; Yoo, Yoon-Sik; Kim, Kiwon; Kim, Byoung-Sik; Lee, Hyungkyu; Park, HeaSook; "ZTA-based Federated Policy Control Paradigm for Enterprise Wireless Network Infrastructure," 27th Asia Pacific Conference on Communications (APCC), IEEE, Jeju Island, Korea, Republic of, Oct. 19-21, 2022, pp. 1-5.*

* cited by examiner

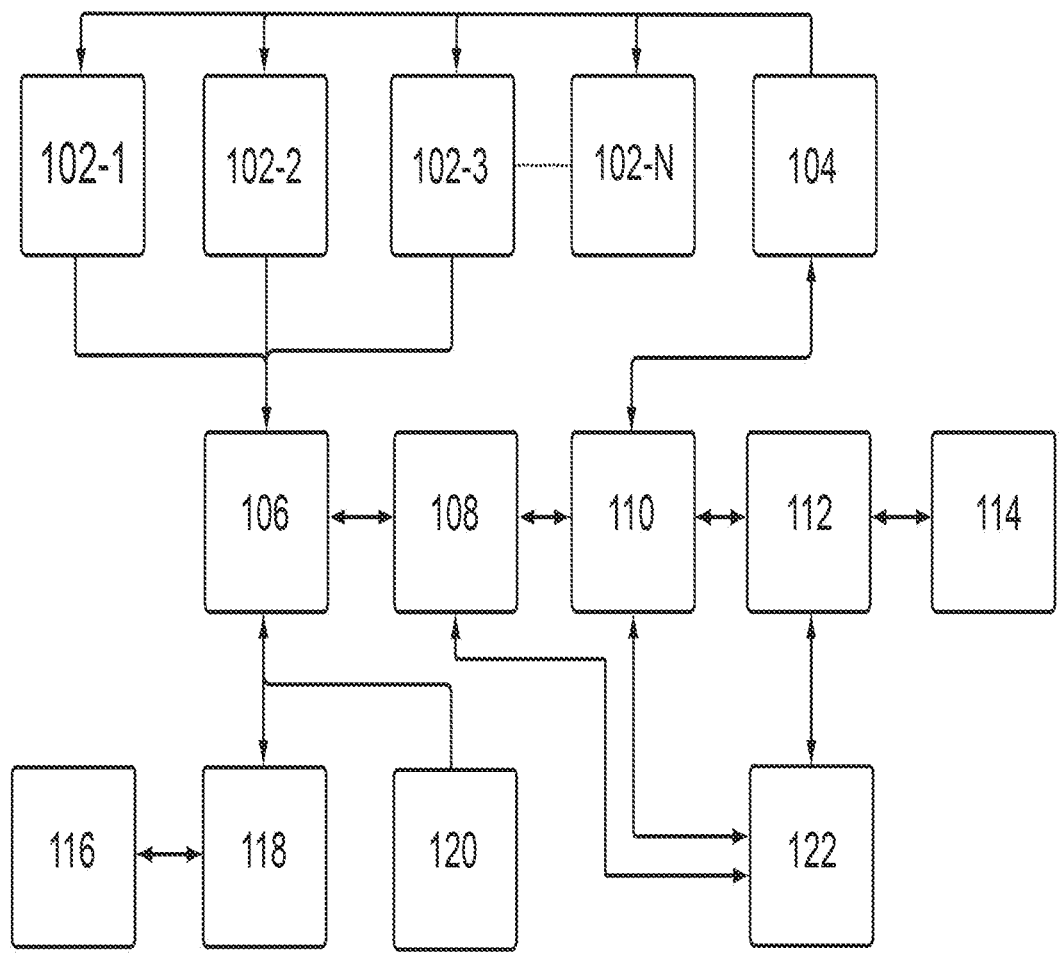

ENTERPRISE PROTECTION VIA IDENTIFICATION AND MITIGATION OF BAD ACTORS AT THE EDGE

FIELD OF THE INVENTION

The present invention relates generally to a smart communication system, and more particularly, to a smart military communication system that provides enterprise protection via identification and mitigation of bad actors at the edge.

BACKGROUND

Efficient and secure battlefield communications have been important in warfare since the advent of warfare. That is especially true today because the modern battlefield interconnects pretty much everything and it is this interconnection that enhances lethality and survivability. Thus, success on the battlefield (e.g., life or death) is dependent upon having efficient and secure battlefield communications. More efficient and secure battlefield communications help ensure greater lethality and better survivability. Accordingly, there is a strong and continuing need to improve battlefield communications security.

SUMMARY OF THE INVENTION

An aspect of the present invention is to provide a method of enterprise protection via identification and mitigation of bad actors at the edge including connecting a first edge device including software implemented in non-transitory computer-readable mediums in a communication network, connecting a second edge device including software implemented in non-transitory computer-readable mediums in the communication network, connecting an enterprise device in the communication network, providing an encrypter for homomorphic encryption to the first edge device, and providing the encrypter for homomorphic encryption to the second edge device. A first data set susceptible to a mathematical operation that includes time stamps is encrypted with the encrypter and transmitted to both the second edge device and the enterprise device from the first edge device as an encrypted first data set, and a second data set susceptible to the mathematical operation that includes time stamps is combined with the encrypted first data set with the encrypter by the second edge device to produce an encrypted second data set and the encrypted second data set is transmitted to the enterprise device from the second edge device. The first edge device and second edge device have fixed parameters known to the enterprise device. An approximate transmission time required for the first data set to be transmitted from the first edge device to the second edge device is known to the enterprise device, an approximate transmission time required for the first data set to be transmitted from the first edge device to the enterprise device is known to the enterprise device, and an approximate transmission time required for the second data set to be transmitted from the second edge device to the enterprise device is known to the enterprise device. The enterprise device uses the time stamps of the first data set, the times stamps of the second data set, the approximate transmission time required for the first data set to be transmitted from the first edge device to the second edge device, the approximate transmission time required for the first data set to be transmitted from the first edge device to the enterprise device, and the approximate transmission time required for the second data set to be transmitted from the second edge device to the enterprise device are used by the enterprise device to determine if the second edge device is operating as expected.

The determining if the second edge device is operating as expected may be performed repeatedly. The determining if the second edge device is operating as expected may be performed periodically. The determining if the second edge device is operating as expected may use a computation transmitted to the second edge device which the second edge device performs. An expected time to complete the computation on the second edge device is calculatable from the fixed parameters of the second edge device, and if an actual time to complete the computation on the second edge device deviates from the expected time by a predetermined amount, the second edge device may be flagged as potentially being compromised by an outside party. The determining if the second edge device is operating as expected may use a computation transmitted to the first edge device and the second edge device, where the first edge device and the second edge device cooperatively perform the computation.

An approximate transmission time required for a third data set to be transmitted from the second edge device to the first edge device may be known to the enterprise device, an expected time to complete the computation is calculatable from: the fixed parameters of the first edge device, the fixed parameters of the second edge device, the approximate transmission time required for the third data set to be transmitted from the second edge device to the first edge device, and the approximate transmission time required for the first data set to be transmitted from the first edge device to the second edge device, and if an actual time to complete the computation deviates from the expected time by a predetermined amount, the second edge device may be flagged as potentially being compromised by an outside party.

Whether the second edge device should be granted security access, merits further security checks, or should be considered compromised, may be determined by whether the second edge device is operating as expected. When the enterprise device determines the second edge device should be granted security access, the enterprise device allows the second edge device to access at least some secure information, when the enterprise device determines the second edge device merits further security checks, the enterprise device performs further security checks on the second edge device, and when the enterprise device determines the second edge device should be considered compromised, the enterprise device either quarantines the second edge device or connects the second edge device to a synthetic network. The synthetic network created for the second edge device may include altered information and functionality similar to that associated with the second edge device. Interactions by the second edge device with the synthetic network may be monitored. The security checks may be updated based upon information developed from when the synthetic network was monitored.

The method may further include running a homomorphic encrypted artificial intelligence on the second edge device that remains encrypted while running. The method may further include providing a homomorphic encrypted ledger (a ledger is also known as an index) on the second edge device that includes hashed values. The homomorphic encrypted ledger may identify the first edge device by location information, time stamp, and adjacent associated physical devices to the first edge device. The homomorphic encrypted ledger may further identify the first edge device with one or more of adjacent associated logical connections to the first edge device, applications running on the first edge device, algorithms running on the first edge device and analytics running on the first edge device.

The time stamps of the first data set and the times stamps of the second data set both may use a time protocol which is randomly selected. The time stamps of the first data set and the times stamps of the second data set both use a time protocol which may be changed in a predetermined order. The time stamps of the first data set and the times stamps of the second data set both may use a time protocol which is changed after a predetermined period of time. The time stamps of the first data set and the times stamps of the second data set both may use a time protocol which is changed after a random period of time.

BRIEF DESCRIPTION OF THE DRAWINGS

The invention will be described in detail with reference to the following drawings in which like reference numerals refer to like elements wherein:

FIG. 1. Illustrates an architecture of military communication systems upon which the present invention may be implemented.

DETAILED DESCRIPTION

Information is critical for current and future battlespaces. As a result, safeguarding information from the enemy is necessarily critical. This may be achieved by the identification and mitigation of bad actors at the edge according to the present invention.

Adaptive Force Packages (AFP) are essentially the personnel and their associated equipment that can be tailored to meet the specific needs of a given mission. An AFP will be most effective where there is a high confidence regarding target location and battlespace awareness where the AFP is able to perform high tempo actions. However, target location and battlespace awareness are exactly the kind of information the enemy wants most and will try to achieve by breaching any networks that will allow the target location and battlespace awareness information to be stolen, altered or eliminated. Enemies that operate within the network and manipulate data on the network will attempt to create a "false reality" for Battle Management Systems (BMS).

The current Department of Defense (DoD) implemented battlefield communications solutions focus on networking, transport, and physical interfaces tied to commercial telecommunications companies such as SpaceX (Starlink), Cisco and Juniper. The resultant battlefield communications platforms therefore mirror the structure and functionality of commercial communications systems. These commercial communication platforms provide Enterprise-to-Secure-Edge service (while the equivalent in DoD parlance is called National-to-Tactical) and are primarily focused on network and transport of electronic communications traffic. However, the military environment and priorities do not mirror the commercial environment and priorities.

The inventive smart communication system as discussed above may be implemented on and interconnected with existing hardware. However, the optional Chip Scale Atomic Clocks (CSAC) may be included in new hardware or retrofitted into existing hardware. For less accurate clocks, if the rate of drift from the actual time is consistent and known, this may be used to verify an associated edge device is not being spoofed.

Homomorphic encryption allows one or more types of computations to be performed without decrypting the data. The computations may be either Boolean or arithmetic. Various types of homomorphic encryption are known including partially homomorphic, somewhat homomorphic, leveled fully homomorphic, and fully homomorphic encryption. Partially homomorphic encryption allows only one type of computation, e.g., addition or multiplication. Somewhat homomorphic encryption allows two types of computations, but only for a limited subset of computations. Leveled fully homomorphic encryption allows arbitrary computations composed of multiple types of computations of bounded (pre-determined) depth. Fully homomorphic encryption allows arbitrary computations composed of multiple types of computation of unbounded (not pre-determined) depth. The more freedom to perform various computations and the less bounded the computations are, the more time it takes a computer to encrypt data.

FIG. 1 illustrates an architecture of military communication systems 100 upon which the present invention may be implemented. The military communication system 100 has various component blocks including edge devices (102-1, 102-2, 102-3, . . . 102-n) (collectively 102), a connection key module 104, a frangible engine 106, a time sync fusion engine 108, a decision module 110, a core mesh resources 112, a homomorphic encryption module 114, a neural network 116, a unique cipher fingerprint module 118, a high quality time sync 120, and enterprise hash engine 122. Edge devices 102 include most devices including central processing unit with a clock. The clock may be a CSAC or less accurate clock. Edge devices 102 typically have a particular function based upon what a particular edge device is designed to do. Some edge devices also include global positioning systems and/or are Wi-Fi enabled. The connection key module 104 provides a time limited enterprise to edge connection key for index updates. When new fingerprints for anomalies (e.g., bad actor hacking attempts or devices detected as compromised) are ascertained, the communication system 100 updates the edge devices 102 and any other systems that need to be updated. The frangible engine 106 curates device specific challenges that confirm or deny edge devices 102 being registered as benign or adversarial. The frangible engine 106 also unifies the high quality time sync 120 and a frangible index as a central orchestrator providing ephemeral access to enterprise core resources, updating to the enterprise index supporting tailoring of data being provided to the edge according to the ledger/index; as well as, deploys to frangible magazines curated functions that support edge device 102 meshed validation and endpoint detection. The time sync fusion engine 108 uses information related to one or more edge devices 102 to determine if a particular edge device has been compromised or potentially compromised by a bad actor, if it is acting normally, or something else. This can be done by determining if the reported clock information is not the correct time, if the reported clock time makes no sense based on geolocation, or otherwise. The decision module 110 uses information from the time sync fusion engine 108 to decide whether to allow a particular edge device access by allowing a connection. If a particular edge device is determined to be trustworthy, it will be allowed ephemeral access. This contrasts to the prior art which would allow continuing access until such access become revoked. If it is determined to be compromised the connection may be denied or terminated, or alternatively compromised edge device may be connected to a misinformation system, rings of super-computers and/or connected to a system to analyze how the compromised system operates. If the particular edge device is determined to need further review, a decision will be made whether to allow the connection or deny it, and whether to limit the access provided in any allowed connection, and whether further verification of the particular edge device should be undertaken. The core mesh resources 112 stores data. The homomorphic encryption module 114 provides the encrypter for homomorphic encryption. The neural network 116 uses the available data to machine learning (e.g., generative artificial intelligence) to determine bad actors' methods and cyber footprints such that they may be provided to the edge devices 102 via updates and incorporated into the unique cipher fingerprint module 118. The unique cipher fingerprint module 118 stores known cipher fingerprints. The high-quality time sync 120, although optional, may be any high-quality clock device including, for example, a CSAC. The high-quality time sync 120 synchronized in a different relative time outside of UTC, such as one composed of IERS and TAI combined. Alternatively, by making the high-quality time sync 120 set to a variable or random time, it may cause timing problems for bad actors trying to compromise or having compromised an edge device. The enterprise hash engine 122 receives data and returns hashed values.

The various component blocks of the military communication system 100 at least partially implemented with non-transitory computer-readable medium such as Random Access Memory (RAM), hard drives, or any other suitable non-transitory computer-readable medium able to implement the various component blocks.

Chip Scale Atomic Clock: Chip Scale Atomic Clocks (CSAC) 104 are used in military systems including dismounted Improvised Explosive Device (IED) jammers, dismounted Software Defined Radios (SDR), GPS receivers, and Unmanned Aerial Vehicles (UAVs). Chip Scale Atomic Clocks (CSAC) provide high precision time stamps that supports anti-spoofing, anti-networking and routing efforts, aids in improving Content Data Networking (CDN) actions (e.g., co-location according to user-sensor needs) based upon time delays due to disconnected intermittent and latent communications. Chip scale atomic clocks support multi-level security data movement tied to dynamic data movement (e.g., geolocation) to prevent ghosting of data across different classifications, domains, or otherwise. Advantageously, time delays are registered and instead of duplicate and/or stale data being rendered across the network, accurate timing tags allows smart communications systems to redact and remove redundant and/or stale data that would appear to be two separate data entities vs. the reality where those two stamps are the same but outside of time sync (termed ghosting of data).

Chip scale atomic clocks are used to create coherent geolocation of hashed entities tied to "hidden users" either inside of data flows of tenant system or packet level awareness of all traffic on gateway system. Chip scale atomic clocks are key to supporting accurate mobile data archival, federation, tagging, and data retrieval across distributed meshed gateway systems. Chip scale atomic clocks support Radio Frequency (RF) front ends of decomposed edge Software Defined Radios (SDR) and sensor systems that utilize synchronized complex data exchanges over time (e.g., Orthogonal Frequency Division Multiplexing (OFDM) cellular 4G/5G networks linked to carrier aggregation and beam-forming technologies). Chip scale atomic clocks aid in identifying opposition cyber targeting actions tied to distributed attacks on gateway systems (e.g., massive denial of services tied to synchronized actions on common interfaces, ports, and protocols). Chip scale atomic clocks aid in improving traffic flow of when things are pushed or pulled to edge nodes which have very limited bandwidth (e.g., sending non-mission critical information such as streaming full motion video, out-of-date information, an routine software updates or the like over a constrained link during combat would be considered something that degrades traffic flow during peak demand times while prioritizing enemy movement information proximate to the edge node would be considered an improvement to traffic flow tied to a mission essential tasking need and essential elements of battlespace information.

A chip scale atomic clock, or alternatively any other highly accurate local timing source, that can be used to tag, optimize federation/meshing, support cross domain multi-level security classification movement to prevent ghosting of data objects across distributed areas of the battlespace, and counter adversarial adjustments tied to spoofing and time attacks.

Additionally, there are several choices for time protocols for edge devices (e.g., Network Time Protocol) and these time protocols also come in various formats (e.g., DAYTIME, TIME, and NTP). Similarly, various clocks internal to edge devices operate (e.g., count) in various different ways. By varying which of these is used extra security results. Selection may be made randomly for predetermined or random time intervals, could be selected according to a predetermined schedule, or any suitable combination. Where needed, an indicator of the selection could be included with the timestamps. Because the timing of the edge device may be necessary for bad actor viruses to operate successfully, the changing of the selection may inhibit bad actor viruses and may make spoofed edge devices more readily apparent. For example, a denial-of-service attack is scheduled for a particular time but because the timing is set by the wrong protocol (from the perspective of the virus), the edge device fails to do a denial-of-service attack at the correct time, effectively rendering the virus ineffective.

Post Quantum Cryptography: Post Quantum Resistant (PQR) Cryptography (PQC and PQR are often used interchangeably) that is commercially available or alternatively one that is custom. PQR cryptography provides enhanced security as compared to typical commercial cryptography. PQR cryptography forces an opposing force to invest more computational power and more time to break the encryption. This allows the communication network a greater opportunity to define optimization and processing across its various system components and communication channels driving increased tempo and synchronicity of effects across operations.

Security Based Anomaly Detections: Security based anomaly detections are the identification of important and rare occurrences, items, or events of concern due to their differing characteristics from the majority of the processed data. Such security-based anomaly detections systems are common in cybersecurity and are limited to recognizing anomalies that deviate from an expected norm (a baseline established by human operators and deterministic software systems). Embodiments of the present invention use a common element (time stamps from the clocks of the edge devices 102) in combination with other common information to determine if a particular edge device 102 has been compromised or captured. As such, a new security-based anomaly detection may be implemented to further mitigate bad actors at the edge.

Computation Based Security: Computations may be used to test whether an edge device 102 is being spoofed or is operating from someplace it should not be located. In order to test an edge device, device specific hardware problems may be created by the enterprise and updated across the mesh.

Device specific problems may be generated to be solvable using specific known network and device details that are trusted from the enterprise index. For example, if the network topography is known, reasonable traceroutes may be determined and used for determining time delay across the network. Thus, if a particular edge device 102 is not located where it is supposed to be located, that particular edge device 102 likely will have a time delay other than what is expected.

Exemplary math equations to test an edge device may include device specific information processed as a form of checksum include but is not limited to:

Traveling Salesman problem linked to traceroute and time.

Dirichlet problem which links topic model analysis (discovering hidden model and sematic meaning) to hash index values as the checksum. Thus, tenant systems (inputs/outputs) across the tactical index of mesh are referenced and then a determination is made if there are hidden connections which align with valid Quality of Service (QOS) metrics. In other words, common trends and anomalies aligned with hardware specific metadata elements are tested for and then a comparison may be made to a hash index as a checksum. As a result, the semantic label of a data flow or node belongs to something considered high confidence as a known and trusted element, or if the label belongs to something that is unknown and needing to be assessed (basically Latent Dirichlet Allocation).

Burnside problem to determine mesh group identify legitimacy for finite groups.

Cryptarithm linked to Node ID (Also note co-pending application Ser. No. 18/097,223, filed Jan. 14, 2023).

Waring problem which is used to validate total number of nodes in a network based upon hash index as a checksum.

Partial Differential Equations (PDE) such as Sturm—Liouville problem where boundary values are violated, and the solution is inconclusive.

Graph Theory where node centrality based upon QoS and time to determine overall risk.

Entity Hashing Managing Sensors & Users:

Hashing is one of the most fundamental operations in data management. Hashing allows fast retrieval of data items using a small amount of memory. Hashing is also a fundamental algorithmic operation with rigorously understood theoretical properties. Virtually all advanced programming languages provide libraries for adding and retrieving items from a hash table.

More recently, hashing has emerged as a powerful tool for data similarity searching. Here the objective is not exact retrieval but rather the fast detection of objects similar to each other. For example, different images of the same item should have similar hash codes, for different notions of similarity, and we should be able to search fast for such similar hash codes.

Hash functions come in a variety of types. One such type is data-specific hash functions. Unlike the traditional algorithmic approach to hashing, where the hash functions are universal and do not depend on the underlying data distribution.

At its core, indexing is about making things easier to find and retrieve. Examples of indexing methods include a well-organized filing cabinet, encyclopedias, and even labeled aisles in a grocery store. Anytime we have lots of things where there is a need to find or identify a specific thing, an index makes finding that thing easier. With the co-pending application Ser. No. 18/097,223, filed Jan. 14, 2023, which is incorporated in its entirety by this reference, hashing is used as an organized index of digital information that may reside on any number of digital devices at one or more locations. The hashing function does not require a person to decide how to classify the data, therefore allowing for an automated process to be mapped to I3T and invention sub-components.

To understand how Machine Learning and Artificial Intelligence can be used to recreate the critical features of a hash table (and other indexes), it is worth quickly revisiting the main idea of statistical modeling. A model, in statistics, is a function that accepts some vector as input and returns either: a label (for classification) or a numerical value (for regression). The input vector contains all the relevant information about a data-point, and the label/numerical output is the model's prediction.

In a model that predicts if a high school student will get into Harvard, the vector might contain a student's GPA, SAT Score, number of extra-curricular clubs to which that student belongs, and other values associated with their academic achievement; the label would be true/false (for will get into/won't get into Harvard).

In a model that predicts mortgage default rates, the input vector might contain values for credit score, number of credit card accounts, frequency of late payments, yearly income, and other values associated with the financial situation of people applying for a mortgage; the model might return a number between 0 and 1, representing the likelihood of default.

Typically, machine learning is used to create a statistical model by combining a large dataset with a machine learning algorithm. Running the algorithm on the dataset produces a trained model. Such algorithms automatically build accurate models from raw data without the need for the humans to help the machine "understand" what the data actually represents. This is different from other forms of analytics or artificial intelligence where humans examine the data extensively, give the computer clues about what the data means (e.g. by defining context aware domain specific relevancy to a user's input), and define how the computer will use that data (e.g. using minimax (minimax is a decision rule used in artificial intelligence, decision theory, game theory, statistics, and philosophy for minimizing the possible loss for a worst case scenario) or A* (A* is a graph traversal and path search algorithm, which is used in many fields of computer science due to its completeness, optimality, and optimal efficiency)). In practice, though, machine learning is frequently combined with classical non-learning techniques; an A.I. agent will frequently use both learning and non-learning tactics to achieve its goals. This invention mirrors that application by applying deterministic and intelligent data hash indexing to other forms of analytics and artificial intelligence support real time operations.

Part of entity hashing is linked to non-traditional algorithmic approach tied to machine learning to find data similar, understand its location, and map common elements of sensors, data streams, and users (physical and logical) needs into vectors pointing and directing the stream processor to be increasingly autonomous during its "If This Then This" (I3T) operations. Thus, hashing uses a function or algorithm to map object data to some representative integer value. This hash, which is also known as a hash code, can then be used as a way to narrow down searches when looking for a particular item; as well as map and predict needs of hidden users of tenant systems and data flows traversing the. Generally, these hash codes are used to generate an index, at which the value is stored.

Because algorithms are repeatable, feeding an image, irrespective of whether that image is a jpeg image, a text document, a hard drive image, or any other format, into the algorithm, similar data will result in similar outputs. If the internal data changes, that output will also change. As such, the hashing index function is incredibly important for managing data balkanization across meshed assets distributed throughout the battlespace.

Exemplary hash functions include, but are not limited to the following:

- CRC32: The crc32 algorithm is used to compute checksums. The two variants used in mhash are MHASH_CRC32 (the one used in ethernet) and MHASH_CRC32B (the one used in ZIP programs).
- ADLER32: The adler32 algorithm is used to compute checksums. It is faster than CRC32 and it is considered to be as reliable as CRC32. This algorithm is defined as MHASH_ADLER32.
- MD5: The MD5 algorithm by Ron Rivest and RSA. In mhash this algorithm is defined as MHASH_MD5.
- SHA1/SHA256/SHA512: The SHA algorithm by US. NIST/NSA. This algorithm is specified for use in the NIST's Digital Signature Standard. In mhash these algorithms are defined as MHASH_SHA1, MHASH_SHA256, and MHASH_SHA512.
- HAVAL: HAVAL is a one-way hashing algorithm with variable length of output. HAVAL is a modification of MD5. Defined in mhash as MHASH_HAVAL256, MHASH_HAVAL192, MHASH_HAVAL160, and MHASH_HAVAL128.
- RIPEMD160: RIPEMD-160 is a 160-bit cryptographic hash function, designed by Hans Dobbertin, Antoon Bosselaers, and Bart Preneel. It is intended to be used as a secure replacement for the 128-bit hash functions MD4, MD5, and RIPEMD. MD4 and MD5 were developed by Ron Rivest for RSA Data Security, while RIPEMD was developed in the framework of the EU project RIPE (RACE Integrity Primitives Evaluation, 1988-1992). In mhash this algorithm is defined as MHASH_RIPEMD160.
- TIGER: Tiger is a fast hash function, by Eli Biham and Ross Anderson. Tiger was designed to be very fast on modern computers, and in particular on the state-of-the-art 64-bit computers, while it is still not slower than other suggested hash functions on 32-bit machines. In mhash this algorithm is defined as: MHASH_TIGER, MHASH_TIGER160, and MHASH_TIGER128.
- GOST: GOST algorithm is a Russian standard and it uses the GOST encryption algorithm to produce a 256 bit hash value. This algorithm is specified for use in the Russian Digital Signature Standard. In mhash this algorithm is defined as MHASH_GOST.
- Linux encryption is typically opens sl, and includes but it not limited to the following: blake2b512, blake2s256, gost, md2, md4, md5, rmd160, sha1, sha224, sha256, sha3-224, sha3-256, sha3-384, sha3-512, sha384, sha512, sha512-224, sha512-256, shake128, shake256, and sm3.

From a data science perspective, hashing is a wonderful tool to assist in cleaning data. For example, obtaining a clean data set of unique images can be a challenge depending on your sources in a large-scale image classifying project. Manual viewing and classification of the images is time consuming and futile in a battlefield environment where the useful lifespan of the images is often only a few minutes. However, hashing provides rapid classification and sorting of the images allowing predictive analytics to provide a warfighter with the data (e.g., images) needed in a timely manner tied to an automated targeting mission.

Hashes for present invention may advantageously incorporate (but not be limited to) the following data:

- Device information,
- Time Stamps of data streams traversing device,
- Time Stamps from data streams from the device,
- Data Streams traversing the device, in combination, data format, and modality,
- Ambient Radio Frequency (RF) information,
- Tenant metrics for downstream devices (hop count, heartbeat, status etc.),
- Software firmware version,
- Last seen on the network detail (pulled from the distributed ledger often),
- Health and Status information for the network,
- Time of day that data is requested (which would feed into historical analytics),
- Type of crypto libraries available on tenant and gateway devices (which would feed into the Software Defined Intelligent Network),
- Availability of processing and storage for tenant systems traversing hash index location and for the gateway system hosting the hash index, and/or
- Security alerts triggered.

Currently QoS solutions tend to focus on throughput and quality of link across the following Key Performance Indicators (KPI). KPI is also known as metrics.

Metrics tied to Communications QoS relevant to the present invention include but are not limited to:

1. Network Jitter

Jitter measures a network's transfer rate consistency and indicates the variability in a delay time. Jitter is usually ignored because Transmission Control Protocol (TCP) connections are very tolerant of jitter and TCP connections handle the majority of network traffic. However, real-time applications like video and voice expect very low jitter. These applications' performances are significantly impacted when jitter is present. Additionally, wireless networks are much more prone to jitter than wired networks because of radio frequency and interference issues. Jitter up to 100 milliseconds is typically acceptable for general data while jitter above 20 milliseconds can cause major issues for real-time data.

2. Bandwidth and Throughput

Although bandwidth and throughput sound similar as wireless network efficiency KPIs, there is a subtle difference. Throughput measures the amount of data actually transferred from one point to another within a network path. Bandwidth is the amount of data that a network path is expected to bear, or that is expected to successfully transfer from one point to another in a network, within a set amount of time. Both bandwidth and throughput can be viewed in terms of Kbps, Mbps or Gbps and the differences between the two can be used to determine the performance of a wireless network.

3. Packet Re-Transmissions

When a data packet is sent out successfully but fails to reach its destination, the data packet needs to be retransmitted. Consequently, the wireless network experiences delays for the transmission in question, as well as a degradation to the overall throughput of the network. While retransmissions exist in all networks, they are much more common in wireless networks due to poor signal strength, hidden nodes, interference from other technologies, and adjacent channel interference.

4. Latency

Latency, also referred to as delay, is a measure of the time consumed in the transfer of data between two points in a network. Latency is generally used to monitor TCP and UDP. High latency is a key indicator of slow network connection and poor performance. The threshold depends upon the situation. For example, a high latency (e.g., up to 100 milliseconds) may be acceptable for general data while lower latencies (e.g., less than 50 milliseconds) are preferred for real-time applications.

Latency can be caused by a variety of factors. In the ideal case, latency is the time for data to travel from the sending device to the receiving device (for the ideal case latency equals the transmission delay). Unfortunately, interference or other wireless factors may prevent the data from reaching the receiving device and the data must be retransmitted. Depending on network utilization and other factors, retransmission may make latency much larger than the transmission delay. Another factor that can increase latency is routing or processing delay which is introduced whenever data is processed by a computer, router, or some other device. The routing or processing delay is not just the operating speed of the computer, router, or some other device, but may also be increased with increased data traffic. Finally, there may be intermediate devices other than the initial sending device and the final receiving device, each of which may increase the routing or processing delay.

IEEE 802.11 specifications have greatly reduced the overhead with roaming operations although roaming operations remains one of the most problematic operations on wireless networks and can adversely affect wireless connections and VoWLAN operating over Virtual Private Networks (VPNs).

As military organizations continue to become increasingly dependent on their wireless networks, maintaining performance continues to mirror the network and transport layer in the commercial sector. However, having military communication systems mirror commercial communication systems fails to recognize and thus fails to address the fact that military communication systems operate in a fundamentally different environment than commercial communication systems.

Advanced Field Artillery Tactical Data System: The Advanced Field Artillery Tactical Data System (AFATDS) provides fully automated support for planning, coordinating, controlling, and executing fires and effects such as mortars, field artillery cannons, rockets, missiles, close air support, attack aviation, and naval surface fire-support systems. AFATDS interoperates and integrates with more than 80 different battlefield systems, including Navy and Air Force command and control weapon systems.

AFATDS is the primary command and control system for Long-Range Precision Fires Cross-Functional Team initiatives, such as Extended Range Cannon Artillery, Extended Range Guided Multiple Launch Rocket System, Precision Strike Missile Program, and Projectile Tracking System.

AFATDS fuses the essential situational awareness data, intelligence information, and targeting data in near real-time to make effective targeting decisions that align with Mission Command guidance and priorities. It pairs targets to weapons to provide optimum use of fire-support assets and timely execution of fire missions.

AFATDS provides the Army, Navy, and Marine Corps with automated fire-support command, control, and communications. It is used to plan, execute, and deliver lethal and nonlethal effects. AFATDS also provides joint/coalition situational awareness for fires execution and mission management. AFATDS runs on laptop computers (e.g., ruggedized laptop computers) with Windows® software. These laptop computers would be considered edge devices 102.

Commercial communication systems do not function well as military communication systems because they fail to adapt to the adversarial environment on the battlefield. Instead, commercial communication systems used in battlefield environments continue to rely upon traffic, port, and protocol rejection (this focus is termed perimeter security) irrespective of whether the environment is a commercial environment or a battlefield environment. This in turns results in a fallacy of thought that perimeter security is sufficient for all military communications needs and the network is both secure and operationally enabling (irrespective of complex security threats and insider risks). The approach of the military communication system of the present invention provides the ability to detect captured or compromised edge devices that otherwise would not be detected.

The military communication system 100 may be operated without connection to any other military communication systems 100 or may be connected to and operated with one or more other military communication systems 100. The various blocks or components of the military communication system 100 may include multiples of each.

EXAMPLES

Captured edge device: Hostile forces (i.e., bad actors) capture an edge device at a known allied location and move it to a location in the enemy lines. The edge device is remotely connected to the communication network at the location it was captured. The edge device has known transmission times at the allied location which differ from the transmission times from the at the location in the enemy lines. As such the captured edge device will be quickly identified and any damage from data that might otherwise be compromised is mitigated.

Spoofed edge device: Hostile forces (i.e., bad actors) spoof an edge device at a known allied location. The device spoofing the edge device is remotely connected to the communication network at the known allied location. The edge device has known transmission times at the known allied location which differ from the transmission times from the device spoofing the edge device. As such the device spoofing the edge device will be quickly identified and any damage from data that might otherwise be compromised is mitigated.

Spoofed edge device with different hardware: Hostile forces (i.e., bad actors) spoof an edge device at a known allied location by copying the relevant software onto another device which has different hardware than the edge device. The device spoofing the edge device is connected to the communication network at the known allied location. The edge device has known transmission times at the known allied location which are the same as the transmission times from the device spoofing the edge device. As such the device spoofing the edge device will not be identified as a bad actor. However, when a computation is transmitted to the second edge device and is performed by the device spoofing the edge device, if the device spoofing the edge device performs it at a different speed, the device spoofing the edge device will reveal itself as a bad actor and can be mitigated. It should be noted that the historic processing speeds of computer processors are approximately logarithmically linear over time which means small differences in hardware manufacturing age will result in large differences in computation times. Thus, running a computation on spoofed edge device with different hardware than the edge device being spoof may reveal the spoofed edge device with different hardware as a bad actor.

A variation on the above computation has the computation cooperatively performed with another edge device. The another edge device could even be randomly chosen to make it more difficult for a bad actor to escape detection. The cooperative nature of the computation means that the edge device being tested may fail if it is located too remotely from the edge device it needs to cooperate with to perform the computation.

Although several embodiments of the present invention and its advantages have been described in detail, it should be understood that changes, substitutions, transformations, modifications, variations, permutations, and alterations may be made therein without departing from the teachings of the present invention, the spirit and the scope of the invention being set forth by the appended claims.

REFERENCE NUMERALS AND DESIGNATIONS 100 military communication system
102-1, 102-2, 102-3, . . . 102-n (collectively 102) edge devices
104 connection key module
106 frangible engine
108 time sync fusion engine
110 decision module
112 core mesh resources
114 homomorphic encryption module
116 neural network
118 unique cipher fingerprint module
120 high quality time sync
122 and enterprise hash engine

What is claimed is:

1. A method of enterprise protection via identification and mitigation of bad actors at the edge comprising:
connecting a first edge device including software implemented in non-transitory computer-readable mediums in a communication network;
connecting a second edge device including software implemented in non-transitory computer-readable mediums in the communication network;
connecting an enterprise device in the communication network;
providing an encrypter for homomorphic encryption to the first edge device; and
providing the encrypter for homomorphic encryption to the second edge device;
wherein a first data set susceptible to a mathematical operation that includes time stamps is encrypted with the encrypter and transmitted to both the second edge device and the enterprise device from the first edge device as an encrypted first data set;
wherein a second data set susceptible to the mathematical operation that includes time stamps is combined with the encrypted first data set with the encrypter by the second edge device to produce an encrypted second data set and the encrypted second data set is transmitted to the enterprise device from the second edge device;
wherein the first edge device has fixed parameters know to the enterprise device;
wherein the second edge device has fixed parameters know to the enterprise device;
wherein an approximate transmission time required for the first data set to be transmitted from the first edge device to the second edge device is known to the enterprise device;
wherein an approximate transmission time required for the first data set to be transmitted from the first edge device to the enterprise device is known to the enterprise device;
wherein an approximate transmission time required for the second data set to be transmitted from the second edge device to the enterprise device is known to the enterprise device;
wherein the enterprise device uses the time stamps of the first data set, the times stamps of the second data set, the approximate transmission time required for the first data set to be transmitted from the first edge device to the second edge device, the approximate transmission time required for the first data set to be transmitted from the first edge device to the enterprise device, and the approximate transmission time required for the second data set to be transmitted from the second edge device to the enterprise device are used by the enterprise device to determine if the second edge device is operating as expected.

2. The method of claim 1, wherein the determining if the second edge device is operating as expected is performed repeatedly.

3. The method of claim 1, wherein the determining if the second edge device is operating as expected is performed periodically.

4. The method of claim 1, wherein the determining if the second edge device is operating as expected uses a computation transmitted to the second edge device which the second edge device performs.

5. The method of claim 4,
wherein an expected time to complete the computation on the second edge device is calculatable from the fixed parameters of the second edge device, and
wherein if an actual time to complete the computation on the second edge device deviates from the expected time by a predetermined amount, the second edge device is flagged as potentially being compromised by an outside party.

6. The method of claim 1,
wherein the determining if the second edge device is operating as expected uses a computation transmitted to the first edge device and the second edge device, and
wherein the first edge device and the second edge device cooperatively perform the computation.

7. The method of claim 6,
wherein an approximate transmission time required for a third data set to be transmitted from the second edge device to the first edge device is known to the enterprise device,
wherein an expected time to complete the computation is calculatable from:
the fixed parameters of the first edge device,
the fixed parameters of the second edge device,
the approximate transmission time required for the third data set to be transmitted from the second edge device to the first edge device, and
the approximate transmission time required for the first data set to be transmitted from the first edge device to the second edge device, wherein if an actual time to complete the computation deviates from the expected time by a predetermined amount, the second edge device is flagged as potentially being compromised by an outside party.

8. The method of claim 1, wherein whether the second edge device should be granted security access, merits further security checks, or should be considered compromised, is determined by whether the second edge device is operating as expected, wherein when the enterprise device determines the second edge device should be granted security access, the enterprise device allows the second edge device to access at least some secure information, wherein when the enterprise device determines the second edge device merits further security checks, the enterprise device performs further security checks on the second edge device, and wherein when the enterprise device determines the second edge device should be considered compromised, the enterprise device either quarantines the second edge device or connects the second edge device to a synthetic network.

9. The method of claim 8, wherein the synthetic network created for the second edge device includes altered information and functionality similar to that associated with the second edge device.

10. The method of claim 9, wherein interactions by the second edge device with the synthetic network are monitored.

11. The method of claim 10, wherein the security checks are updated based upon information developed from when the synthetic network was monitored.

12. The method of claim 1, further comprising providing a homomorphic encrypted ledger on the second edge device that includes hashed values.

13. The method of claim 12, wherein the homomorphic encrypted ledger identifies the first edge device by location information, time stamp, and adjacent associated physical devices to the first edge device.

14. The method of claim 13, wherein the homomorphic encrypted ledger further identifies the first edge device with one or more of adjacent associated logical connections to the first edge device, applications running on the first edge device, algorithms running on the first edge device and analytics running on the first edge device.

15. The method of claim 1, wherein the time stamps of the first data set and the times stamps of the second data set both use a time protocol which is randomly selected.

16. The method of claim 1, wherein the time stamps of the first data set and the times stamps of the second data set both use a time protocol which is changed in a predetermined order.

17. The method of claim 1, wherein the time stamps of the first data set and the times stamps of the second data set both use a time protocol which is changed after a predetermined period of time.

18. The method of claim 1, wherein the time stamps of the first data set and the times stamps of the second data set both use a time protocol which is changed after a random period of time.

19. The method of claim 1, further comprising running a homomorphic encrypted artificial intelligence on the second edge device that remains encrypted while running.

* * * * *